United States Patent Office 3,547,849
Patented Dec. 15, 1970

3,547,849
ALKYD MODIFIED VINYL ACETATE-ETHYLENE COPOLYMER EMULSION PAINT
Richard J. Kennedy, Wilmington, Del., assignor to E. I. du Pont de Nemours and Company, Wilmington, Del., a corporation of Delaware
No Drawing. Filed Apr. 13, 1967, Ser. No. 630,505
Int. Cl. C09d 3/66, 5/02
U.S. Cl. 260—22
5 Claims

ABSTRACT OF THE DISCLOSURE

A novel paint composition especially suitable for exterior uses where wet adhesion is required is provided. The present paint composition is based on a vinyl acetate-ethylene copolymer emulsion paint containing an alkyd resin. Useful alkyd resins are generally reaction products of polyhydric alcohols and polybasic acids. A particular paint composition containing a long oil castor-phthalic alkyd resin is provided which not only demonstrates improved wet adhesion but also possesses paint film extensibility.

BACKGROUND OF INVENTION

While polymer emulsions useful in paint formulations are known, there has been recently developed a new class of emulsions based on vinyl acetate-ethylene copolymers. Paints based on these new emulsion copolymers are especially useful as interior paints and exhibit good soil removal, color acceptance, scrub resistance, and low temperature coalescence properties. Additionally, for exterior paints these emulsions exhibit good tint retention, chalk resistance, efflorescence resistance and retain a high degree of paint film extensibility on outdoor exposure. However, for exterior applications where extraordinarily high wet adhesion is required, these paints exhibit deficiencies. On the other hand, owing to their aforementioned outstanding properties, there is considerable interest in providing an emulsion paint which would possess all of the above-mentioned desirable features and, additionally, exhibit good wet adhesion.

SUMMARY OF INVENTION

According to the present invention there is provided a paint composition based on a vinyl acetate-ethylene copolymer emulsion which not only displays the aforementioned desirable properties, but additionally exhibits excellent wet adhesion. The paint of the present invention basically comprises a vinyl acetate-ethylene copolymer emulsion and an alkyd resin. Alkyd resins useful in the present invention include those prepared by the condensation of a polyhydric alcohol with a polybasic acid, and generally, also contain drying or non-drying oils. A particular paint composition of the present invention, using as the alkyd resin an oxidizing long oil castor-phthalic condensate, displays exceptionally good wet adhesion, and also possesses unexpectedly good film extensibility properties.

DESCRIPTION OF INVENTION

The particular vinyl acetate copolymer emulsions applicable in the present invention are not widely known. In fact, it is only very recently that the outstanding paint properties of vinyl acetate-ethylene copolymer emulsions have been discovered. However, while comparatively new, the polymer emulsions can be prepared by known methods of emulsion polymerization. Consequently, methods of preparing polymer emulsions such as described in U.S. Pat. 2,724,707, column 5, line 21 to column 6, line 60 are suitable for the preparation of the present polymer emulsions. Other known methods wherein a basic polymerization emulsion is employed are equally operable.

While a variety of polymerization methods using various catalysts and surfactant systems can be used in preparing the polymer emulsions, only selected polymers yield paints possessing the aforementioned exceptional properties. Useful polymers basically comprise polymerized units of vinyl acetate and ethylene and can also include small amounts of other polymerizable monomers such as acrylic acid or methacrylic acid. In general, the polymerized acetate content is about 75–97 weight percent, and preferably 85–95 weight percent. A polymerized ethylene content in the polymer of 3–25 weight percent is generally useful while a content of 5–15 is preferred. Correspondingly, when other polymerizable monomers are present useful amounts range from about 0.1–5 weight percent.

Using the emulsion polymerization methods referred to above, the copolymer of the present invention can be produced in any molecular weight that is desired. Customarily, for paint compositions, a molecular weight of about 100,000 is used; however, substantially higher molecular weights, on the order of about a million or more can also be employed. Similarly, the percent solids of the copolymer emulsion is not limited in the present invention; though emulsions of between 45 and 65 percent solids are customarily used.

When the polymer is prepared by the above-described methods, it is present in an aqueous emulsion as very fine particles. For subsequent paint formulation, it is not necessary to separate the polymer from the emulsion in which it is prepared. Consequently, to formulate the paint composition, the aqueous polymer emulsion is merely mixed with an appropriate pigment dispersion, customarily termed a "grind," and other ingredients such as surfactants, preservatives, flow control agents, fungicides, etc. If needed, other ingredients are also included to adjust the pH of the paint formulation to about 7–9, and preferably 7.5–8.5.

In forming paint compositions useful in the present invention, any of the ordinary insoluble inorganic and organic paint pigments well known in the art can be mixed with the polymer emulsion. The "grind" usually contains the pigment dispersed as an aqueous emulsion containing other ingredients such as surfactants, coalescing agents, anti-foamers, and resin extenders. As is well known, the pigment volume concentration (volume of pigment/total volume of all non-volatile ingredients expressed as percent) of the paint can have an effect on the properties of the paint. In general, a pigment volume concentration of about 15 percent is the minimum proportion of pigment which will provide a paint which has a practical hiding power. On the other hand, 50 percent is usually the maximum pigment volume concentration, while concentrations in the range of 25–40 are most desirable. However, as hereinafter set forth, the selection of an appropriate pigment volume concentration is generally related to the amount and type of alkyd resin used.

The alkyd resins useful in the present invention are generally described as the reaction products of polyhydric alcohols and polybasic acids. Useful alkyd resin compositions, also frequently contain, among other ingredients, high molecular organic acids, and surfactants. Reference is made to U.S. Pats. 2,178,474 and 2,178,475 for a general description of useful alkyd resins and corresponding compositions. Particularly useful alkyd resins are those sold under the tradename "Aroplaz." Representative examples of these resins are: "Aroplaz" 1351 characterized as being an oxidizing long oil castor-phthalic alkyd; "Aroplaz" 1271 characterized as being a pure oxidizing long oil linseed-phthalic alkyd; "Aroplaz" 1274 characterized as being a pure oxidizing long oil soya-tung-phthalic alkyd; and "Aroplaz" 1279 characterized as being a pure oxidizing long oil soya-phthalic alkyd.

The class of alkyds of the oxidizing long oil castor-phthalic type are especially useful in the present invention. The addition of an alkyd resin to an aqueous emulsion paint formulation usually markedly reduces the extensibility of the resultant paint film. In fact, the majority of the modified alkyd resins useful in promoting wet adhesion according to this invention, do reduce the paint film extensibility. However, quite unexpectedly, it has been discovered that the class of alkyd resins of the oxidizing long oil castor-phthalic type not only promote wet adhesion of the paint, but additionally, do not markedly reduce the paint film extensibility. For the purposes of this invention, this type of alkyd is termed a compatible alkyd; which term is meant to include those alkyds which do not reduce film extensibility more than about 45 percent when included in emulsion paint compositions in concentrations up to about 30 weight percent, based on the combined weight of vinyl acetate copolymer and alkyd resin. As hereinafter exemplified, extensibility is indicated by the percent elongation of the film to break. The percent of reduction in film extensibility is based on the extensibility of a paint film containing no alkyd resin addition, but which is otherwise similar to the tested film. A paint containing a compatible alkyd resin is particularly useful in applications where the paint is intended to be applied to a surface which would be expected to undergo dimensional instability. Such surfaces include new wood or unpainted wood substrates.

For such applications as top coat paints where film extensibility is not a significant problem and yet wet adhesion is particularly important, the other alkyd resins mentioned above would be particularly suitable. The use of vinyl acetate copolymer paints containing the alkyds of the present invention is particularly desirable for covering chalky surfaces. Paints heretofore applied to such surfaces have generally shown low wet adhesion.

The amount of alkyd resin addition necessary to effect the improved wet adhesion according to the present invention ordinarily does not exceed 30 percent based on the combined weight of vinyl acetate copolymer and alkyd in the emulsion. However, as stated earlier, the most desirable amount of alkyd resin is related to the pigment volume concentration of the emulsion paint. As is well known, increasing the pigment volume concentration usually reduces the paint film extensibility. Consequently, when using a compatible alkyd at high pigment volume concentrations such as those in excess of about 35 percent, alkyd resin concentrations of about 15–30 weight percent are generally suitable. On the other hand, where the pigment volume concentration is comparatively low, compatible alkyd resin concentrations of 5–15 weight percent are most useful. Where other alkyd resins are used the above relationship is usually reversed. Consequently, with pigment volume concentrations in excess of 35 percent, 5–15 weight percent of alkyd resin is generally used. Similarly, 15–30 weight percent alkyd is ordinarily employed with low pigment volume concentrations.

The following examples illustrate the invention. All parts and percentages are by weight unless otherwise indicated.

For use in the examples, a pigment grind is prepared as follows: The ingredients listed in Table 1 below are combined in the order given and dispersed in a Hockmeyer disperser for 20 minutes at a peripheral blade speed of 4000 f.p.m.

TABLE 1

| Ingredient: | Parts |
| --- | --- |
| Water | 61.2 |
| "Tamol" 731 anionic dispersing agent | 10.0 |
| Potassium tripolyphosphate | 1.0 |
| "Colloid" 581B antifoamer | 2.0 |
| Propylene glycol coalescing solvent | 25.0 |
| 3% "Cellosize" WP-4400 hydroxyethyl cellulose thickener solution | 100.0 |
| "Ti-Pure"® R–902 titanium dioxide | 169.0 |
| "Snowflake" whiting-extender pigment | 200.0 |
| Mica–325 mesh—water ground extender | 25.0 |

EXAMPLE I

A paint composition is formulated by adding to the pigment grind of Table 1 the following ingredients:

(A) 47.2 parts alkyd resin composition of the following premixed ingredients:

| | Parts |
| --- | --- |
| Sun spirits | 4.0 |
| Lead Napthenate drier (24% Pb) | 0.8 |
| Cobalt Napthenate drier (6% Co) | 0.4 |
| "Igepal" CO–630 surfactant (alkyl phenoxy polyaryethylene ethanol) | 1.5 |
| "Aroplaz" 1351 oxidizing long oil castor-phthalic alkyd resin | 40.5 |

(B) 420 parts anionic aqueous dispersion (55% polymer solids) of vinyl acetate-ethylene copolymer ("Elvace"® PB 3–1942).

(C) 67 lbs. water.

(D) 20.5 lbs. of premixed solution of the following ingredients:

| | |
| --- | --- |
| "Super-Ad-IT" diphenylmercuric dodecenyl succinate preservative | 10 |
| Water | 10 |
| Ammonia (28%) stabilizer | 0.5 |

After the addition of the above ingredients to the pigment grind, the mixture is dispersed for 10 minutes at a blade speed of 1500 f.p.m. The resulting paint composition containing about 15 weight percent alkyd resin, based on the combined vinyl acetate copolymer and alkyd resin weight, has a pigment volume concentration of 35%, a consistency of 74 krebs units (K.U.), and a pH of 7.6.

For comparative purposes, a paint formulation is prepared in the same manner as Example I except that the addition of alkyd resin composition, ingredients (A), is omitted, 490 pounds of vinyl acetate copolymer emulsion (B) is added, and only 43 pounds of water (D) is included. The resulting comparative paint has a pigment volume concentration of 35%, a consistency of 76 K.U., and a pH of 7.9.

The paint of Example I and the comparative paint are tested for wet adhesion and film extensibility as follows:

*Wet adhesion.*—White pine wood panels conforming to ASTM Specification D–358–55 having a density of 21.5–25.3 lb./cu. ft. are selected and two coats of paint of each formulation (Example I and Comparative) are applied to one section of each panel. The second coat is applied two hours after the first. The panels are painted under standard conditions of 73° F. (23° C.) and 50% relative humidity. A control paint with known excellent wet adhesion properties is also applied to each panel. The paints are force-dried for 16 hours at 120° F. (49° C.) and, after cooling one hour, the panels are placed with the painted side down in a pan of water for four hours. Then the paints are cross-hatched (100 squares) with a set of razor blades (10 per ½"), blotted with paper towels, and immediately checked for wet adhesion using #232-2/1W2 "Scotch" Brand masking tape. The results are reported (0 to 10 scale) as "primary" adhesion; the adhesion value for the control paint which showed no paint removal from any square was given a value of 10. Correspondingly, paint removal from all squares was rated zero. After the primary test, the panels are dried at 73° F. and 50% relative humidity for 24 hours, soaked again for four hours and a different portion cross-hatched and tested. These results are reported as "secondary" adhesion.

*Extensibility.*—The extensibility is indicated by the percent elongation to break of a dried film after suitable conditioning. The test is accomplished according to proposed ASTM Method (Committee D-1) on "Elongation and Tensile Strength of Free Films of Paint, Varnish, Lacquer, and Related Products." Accordingly, 0.003"–0.004" paint films are prepared and conditioned for 30 days at 50% RH and 73° F. Elongation measurements are made after the conditioning at 30 days.

The Table 2 wet adhesion and elongation results for the Example I paint and the Comparative paint are reported.

TABLE 2

|  | Wet adhesion | | Percent elongation |
|---|---|---|---|
|  | Primary | Secondary | |
| Example I | 8 | 10 | 864 |
| Comparative | 0 | 0 | ~1,000 |

As illustrated by Table 2, compatible alkyd addition to the vinyl acetate-ethylene copolymer emulsion paint markedly increases the wet adhesion and, yet, quite surprisingly does not substantially detract from the film's extensibility.

EXAMPLES II–XVI

In Examples II–XVI other paint formulations containing various quantities and types of alkyd resins are prepared and tested for wet adhesion and film extensibility. Table 3 presents the results of these tests. Aside from the alkyd resin addition, the method of formulation and types and amounts of ingredients are similar to those in Example I.

TABLE 3

| Example | Alkyd resin | Percent Alkyd resin [1] | Wet adhesion Primary | Wet adhesion Secondary | Percent elongation |
|---|---|---|---|---|---|
| II | Aroplaz 1351 | 5 | 3 | 10 | 596 |
| III | do | 10 | 8 | 10 | 585 |
| IV | do | 30 | 9 | 10 | 950 |
| V | Aroplaz 1271 | 5 | 2 | 2 | 479 |
| VI | do | 10 | 0 | 0 | 412 |
| VII | do | 15 | 6 | 9 | 176 |
| VIII | do | 30 | 10 | 10 | 206 |
| IX | Aroplaz 1279 | 5 | 6 | 9 | 475 |
| X | do | 10 | 2 | 9 | 442 |
| XI | do | 15 | 2 | 7 | 394 |
| XII | do | 30 | 10 | 8 | 231 |
| XIII | Aroplaz 1274 | 5 | 6 | 0 | 540 |
| XIV | do | 10 | 9 | 8 | 451 |
| XV | do | 15 | 4 | 8 | |
| XVI | do | 30 | 7 | 9 | 239 |

[1] Based on combined vinyl acetate copolymer and alkyd.

I claim:
1. An aqueous emulsion paint composition having a pigment volume concentration of about 15–50 and comprising:
   (A) a vinyl acetate-ethylene copolymer containing about 75–97 weight percent polymerized vinyl acetate, and about 3–25 weight percent polymerized ethylene, and
   (B) an alkyd resin composition wherein the alkyd resin is a long oil modified polyhydric alcohol-polybasic acid condensate; the alkyd resin being present in an amount of about 5–30 weight percent, based on the combined vinyl acetate copolymer and alkyd resin weight.
2. The emulsion paint of claim 1 wherein the vinyl acetate copolymer (A) contains about 85–95 weight percent polymerized vinyl acetate, and about 5–15 weight percent polymerized ethylene.
3. The emulsion paint of claim 1 wherein the alkyd resin composition (B) comprises a compatible alkyd resin.
4. The emulsion paint of claim 3 wherein the vinyl acetate polymer (A) contains about 85–95 weight percent polymerized vinyl acetate, and about 5–15 weight percent polmerized ethylene.
5. The emulsion paint of calim 4 wherein the alkyd resin is an oxidizing long oil castor-phthalic condensate.

References Cited

UNITED STATES PATENTS

| 2,485,248 | 10/1949 | Watson et al. | 260—23 |
| 3,139,411 | 6/1964 | Brockman et al. | 260—22 |
| 3,367,896 | 2/1968 | Rosenbaum et al. | 260—23 |

FOREIGN PATENTS

| 1,179,364 | 10/1964 | Germany | 260—23 |

HOSEA E. TAYLOR, Primary Examiner

R. W. GRIFFIN, Assistant Examiner

U.S. Cl. X.R.

106—15; 117—148, 161; 260—16, 17, 23, 29.2, 29.6, 30.8, 32.4, 33.2, 33.6, 40, 41